United States Patent [19]

Sidlo

[11] Patent Number: 4,484,635
[45] Date of Patent: Nov. 27, 1984

[54] GARDEN ROW MAKING TOOL

[76] Inventor: Gordon D. Sidlo, 2610 Boyce St., Hastings, Nebr. 68901

[21] Appl. No.: 400,077

[22] Filed: Jul. 20, 1982

[51] Int. Cl.³ .............................................. A01B 1/02
[52] U.S. Cl. ..................................... 172/26; 172/360; 172/373
[58] Field of Search ................ 172/26, 126, 373, 378, 172/430, 360

[56] References Cited

U.S. PATENT DOCUMENTS

| | | | |
|---|---|---|---|
| 1,339,222 | 5/1920 | Randall | 172/373 |
| 1,414,087 | 4/1922 | Kenny | 172/373 X |
| 3,678,670 | 7/1972 | Welz | 56/400.14 |

Primary Examiner—Richard T. Stouffer
Attorney, Agent, or Firm—Hiram A. Sturges

[57] ABSTRACT

A garden row making tool comprising an elongated handle, a shovel on one side of said handle, a guide on the opposite side of said handle, the guide being adapted to follow a previously made furrow at a time when the shovel is making a new furrow parallel to the furrow the guide is being caused to follow, a support assembly disposed between and interconnecting the shovel and the guide and attached to the handle, the support assembly being extendable for different row spacings, a depth regulating shoe being attached to and disposed behind the shovel, the guide having two parallel planar sides at right angles to the length of the support assembly.

3 Claims, 8 Drawing Figures

GARDEN ROW MAKING TOOL

BACKGROUND OF THE INVENTION

Heretofore there has been a need for a garden row making tool pulled like a hoe and having a shovel on one side of the handle and a guide at the other side of the handle and also characteristics making the tool effective and convenient.

However, there has been in the prior art double-shovel row makers in which the shovels are both used as shovels, or both used, with lighter pressure, as markers, but neither one used as a guide to follow a previously made furrows so as to position a shovel on the opposite side of the tool for accurate digging. For this reason, the shovels of double-shovel diggers have not been designed in a shape for following a furrow, as is a feature of the present invention.

It is an object hereof to provide a shoe following the shovel and adapted to engage in the ground in the furrow the shovel makes for preventing the shovel from digging exessively deep.

Another object is to provide a shoe with an adjustable mounting so the depth of the shovel can be gauged as desired.

Yet another objective is to provide the versatility of various row spacings by providing a tool with a support assembly interconnecting shovel, guide and handle in which the spacing of the shovel and the guide with respect to the handle can be adjusted to various positions for making a tool useful in digging in guided rows of different spacings.

Yet another objective is to provide a guide and shovel with adjustable depth spacing with respect to the support assembly.

Yet another object is to provide the tool with interchangeable guides, one type of guide having a horizontal lower edge, another having a circular shape and being adapted to rotate, particularly for use on flat ground, and another having a serrated outer edge for rotating across rough ground.

Yet another objective is to provide for rapid adjustment of end parts of the support assembly with respect to a central member thereof through the use of a spring and nib device adapted to engage in various openings automatically, the spring and nib being on one moving part of the support assembly, and the openings for receiving the nib being on the other part thereof.

DESCRIPTION OF THE PREFERRED EMBODIMENTS

Figure 1:
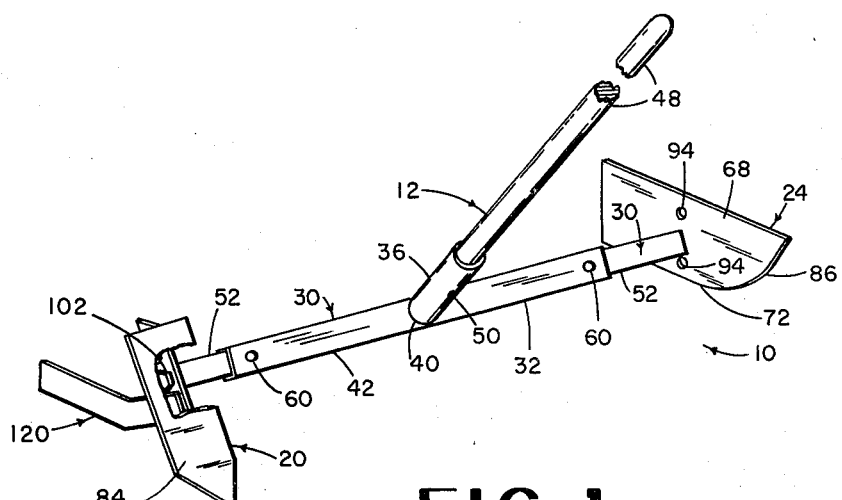
FIG. 1 is a perspective view of the garden row making tool of this invention as seen looking at its forward side from a point to the shovel side of its handle. The upper part of the handle having a section broken away and not shown so that the remainder can be shown on a larger scale. A portion of a shovel being broken away to show parts therebehind.

The garden making tool of this invention is generally indicated at 10 in FIG. 1 and comprises an elongated handle 12. A shovel 20 is disposed on one side of the handle 12. A guide 24 is disposed on the other side of the handle 12. A support assembly generally indicated at 30 is disposed between the shovel 20 and the guide 24 and has a central tubular section 32 to a center of which a sleeve 36 is attached, such as by welding at 40 of a forward end of the sleeve 36 to a flat side of the central member 32 of the support assembly 30.

The central member 32 is preferably made of material square in cross-section which is effective for providing a flat side 42 to which the sleeve 36 is attached.

The sleeve 36, in a sense, forms a part of the handle 12 and can be made of metal, although the handle 12 also has an upwardly and rearwardly extending portion 48 which would preferably be made of wood. The handle 48 and the sleeve 36 can be secured together by a keeper, a portion of which is shown at 50, or in any suitable manner.

The support assembly 30 further has end portions 52 extending outwardly, one at one end, and the other at the other end of the central member 32, the end portions 52 preferably being square in cross-section and snugly and slidably fitting the central member 32 telescopically, being inside the central member 32.

The central member 32 has a pair of connectors 60 extending therethrough, one at its left end and one at its right, and the connectors 60 are adapted to extend through suitable openings 64 in the respective end members 52.

The openings 64 are spaced along the respective end members 52. Each connector 50 then extends through its respective end and into a selected one of the respective openings 64 in accordance with how far inwardly of the central member 32 that it is desired that a respective end member 50 to be disposed.

This makes it possible to regulate the spacing of the shovel 20 and the guide 24 for making rows of different spacings.

The connectors 60 are of a removable kind sufficient that they can be removed from the end members 52 enough to slide the end members 52 along the connectors 60 to move to selected positions as desired.

Figure 4:
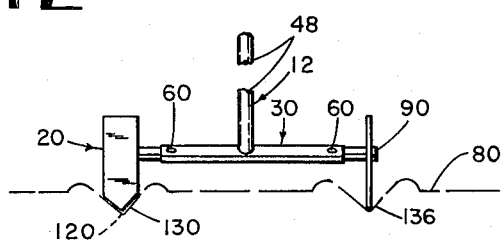
FIG. 4 is a diagrammatic view showing the tool of FIG. 1 as it would be seen when looking horizontally toward its forward side at ground level, a section of the upper part of the handle being broken away, the ground level with two furrows being shown in dotted lines.
Figure 5:
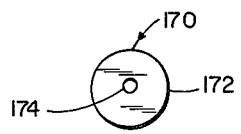
FIG. 5 is a view showing a modified guide as it would be seen looking along the support assembly. This guide being circular in circumference.

The end member 52 is disposed in abutment with inner surface 68 of the guide 24 so that the guide 24 has the lower edge 72 disposed parallel to the elongation of the handle 12 as the entire tool is seen looking horizontally across the surface of the earth, which latter is seen at 80 in FIG. 4 at a time when the handle 12 is being held in a position such that it extends upwardly and toward an operator when the operator is pulling the handle toward himself and when the operator, not shown, is facing the forward surface 84 of the shovel 20.

The guide 24 has an upwardly and forwardly inclined forward edge 86 also facing the operator, not shown.

As best seen in FIG. 4, a bolt 90 extends through a selected one of a plurality of openings 94 vertically spaced along the guide 86 so that the depth of the lower edge 72 of the guide downwardly from the support assembly 30 can be regulated by disposing the bolt 90 through a selected one of the holes 94.

Figure 3:
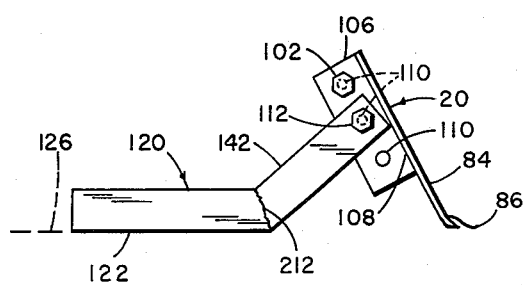
FIG. 3 is a view of the shovel and shoe of the left end of FIG. 1 as it would be seen from the left end of FIG. 1. The shoe is attached to a shovel bracket at a higher place in FIG. 3 than in FIG. 1, as it is adjustable.

The shovel 20 has a forward surface 84 which can simply be flat for economy, but which is inclined downwardly and forwardly, as shown at 86 at its lower end, although most of the forward surface 84 of the shovel is flat and disposed in a plane at a right angle to the elongation of the support assembly 30 and a bolt 102 can extend through a bracket 106, which latter is welded to the backside of the shovel, for example, as one way of attachment, such a weld being at 108. The bracket 106 has bracket holes 110 therethrough which are spaced apart upwardly and downwardly of each other in a row parallel to the majority of the forward face 84 of the shovel. For convenience, the other bracket holes 110 of FIG. 3 are shown in dotted lines, except for the lowest one. The bolt 102, therefore, extends through one of the holes 110 and is threadedly secured into the adjacent end of the adjacent one of the end members 52 of the support assembly 30.

Another bolt 112 extends through a selected one of the bracket holes 110 and secures the shoe at 120 to the rearward side of the shovel 20. The shoe has a horizontal lower edge 122 which is adapted to engage the ground, as indicated by a dotted line 126, which latter represents the lower edge of a new furrow 130 which is seen in FIG. 4 which is being freshly cut by the shovel 20 in exact parallelism with an old furrow 126 in the ground 80 which is cut by the shovel 20 in a previous pass down a garden row.

The shoe 120 is simply flat on its sides and has an upwardly and forwardly extending portion 142 which is connected by a bolt 112 to the bracket 106 at a desired level.

The function of the shoe 120 is to prevent the shovel 20 from digging into the ground to an excessive extent.

The bolt 112 can be used at any selected one of the bracket holes 110 to position the shoe with respect to the shovel for the digging with the shovel at a desired depth automatically gauged and regulated by the position of the shoe 120 and by its undersurface 122.

The undersurface 122 by engaging the ground level 126 at the bottom of the furrow 130, holds the shovel in a desired position.

FIG. 4 shows a modification of the guide 24 at 170. A modification being a circular guide 170 having a circular exterior 172 and having a central opening 174 for receiving the bolt 90.

Figure 6:
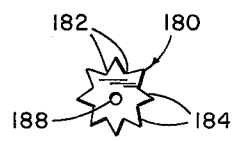
FIG. 6 shows a modified guide with a serrated edge shown as it would be seen looking along the support assembly.

A serrated guide modification 180 is shown in FIG. 6 having notches 182 in its circumference and with sharp protrusions 184 projecting from its circumference.

The serrated guide 180 has an opening 188 at its center for receiving the bolt 90.

Figures 7, 8:
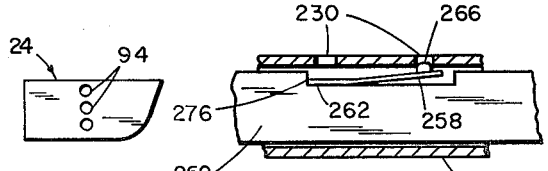
FIG. 7 shows the guide of FIG. 1 as it would be seen looking along the support assembly.
FIG. 8 is a detail showing a modified way of attaching together a support assembly central member and a support assembly end member by means of a spring and nib assembly.

In FIG. 7 the guide 24 is shown with its guide holes 94 clearly illustrated.

The economy of manufacture of the shoe out of strap iron is made possible by cutting the strap iron off at an angle whereby a weld is used at 212, as best seen in FIG. 3 and the forward part 182 of the shoe can extend upwardly about 40°, more or less, from its horizontal under edge 122.

For most gardening, it is desirable that the spacing from the tip of the shovel to the guide 24 be from 22 inches to 28 inches.

The guide will be found to be an effective tool to prevent the shovel from going from left to right, whereby straight furrows are made.

FIG. 8 shows a modification in which a row of central member openings 230 extends lengthwise of a left end portion of the modified central member 232, the right end of the central member 232 not being shown, but being similarly provided with a row of openings 230.

Figure 2:
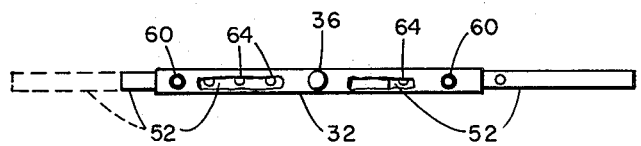
FIG. 2 is a top plan view of a central part of the tool of FIG. 1 shown with parts of the outer side of the central member of a support assembly being broken away and one of the end members of the support assembly being shown in an inner position in full lines and in an outer position in dotted lines. The parts in FIG. 2 are shown as they would be seen looking along the length of the handle.

In FIG. 8 an end member 252 similar to the end member 52 of FIGS. 1 and 2 is provided, but it need not have any end member openings therethrough. Instead, an elongated spring 258 extends lengthwise of the end member 252 and is welded thereto at 262 and is biased so that a nib 266 fastened to the outer side of the spring 258 becomes pressed into a selected one of the central member openings 230 in accordance with the position of the end member 252 at a time when it is in its desired setting for width of row spacing.

In the modification of FIG. 8, the spring 258 can be received in a notch 276 in the adjacent side of the end member to which it is attached so that the end member can otherwise snugly and slidably fit the central member 232.

To change the position of the end member 232, the operator simply presses the nib 266 inwardly so as to cause it to pass by under the adjacent inner surface of the central member 232 as the respective end member 252 is slid into a preferred position. In such latter position, the nib 266 will then rise again into a different central member opening 230. The nib will keep its end member firmly in place during use.

I claim:

1. A garden row making tool comprising an elongated handle, a shovel on one side of said handle, a guide on the opposite side of said handle, said guide being adapted to follow an old furrow at a time when said shovel is making a new furrow parallel to said old furrow, a support assembly disposed between and interconnecting said shovel and said guide and attached to the handle, said support assembly being adjustable in length for spacing said shovel and said guide apart various amounts for different row spacings, said support assembly comprising an elongated central member connected to said handle and having right and left portions on right and left sides of said handle, elongated right and left end members telescopically received on right and left portions of said central member, said shovel and said guide being attached each to a different one of said end members, said guide having two parallel substantially planar sides forming the major surfaces thereof, said sides extending at right angles to the length of said elongated central member and parallel to the longitudinal axis of said handle, said shovel being provided with two opposing major surfaces, sais surfaces being generally perpendicular to the longitudinal axis of said handle and to the major surfaces of said guide, said tool being free of any parts extending a substantial distance down from said right and left support assembly portions.

2. The garden row making tool of claim 1 having a shoe mounted on said shovel and disposed behind said shovel and having an under-surface disposed above the lower end of said shovel, said shoe resisting movement of said shovel vertically down into the ground beyond a desired set distance.

3. The garden row making tool of claim 1 having said right end member and said central member defining a pair of telescoping members having a plurality of spacings therein spaced various distances from said handle and disposed in a row, said attachment means attaching said right end member to said central member comprising spring-urged nib means on the other of said telescoping members and removably received in a selected one of said spaced openings of said row.

* * * * *